US008170116B2

(12) United States Patent
Wang et al.

(10) Patent No.: US 8,170,116 B2
(45) Date of Patent: May 1, 2012

(54) REFERENCE PICTURE MARKING IN SCALABLE VIDEO ENCODING AND DECODING

(75) Inventors: Ye-Kui Wang, Tampere (FI); Miska Hannuksela, Ruutana (FI); Xianglin Wang, Santa Clara, CA (US)

(73) Assignee: Nokia Corporation, Espoo (FI)

( * ) Notice: Subject to any disclaimer, the term of this patent is extended or adjusted under 35 U.S.C. 154(b) by 1375 days.

(21) Appl. No.: 11/691,467

(22) Filed: Mar. 26, 2007

(65) Prior Publication Data

US 2007/0223575 A1 Sep. 27, 2007

Related U.S. Application Data

(60) Provisional application No. 60/786,645, filed on Mar. 27, 2006.

(51) Int. Cl.
| H04B 1/66 | (2006.01) |
| H04N 7/12 | (2006.01) |
| H04N 11/02 | (2006.01) |
| H04N 11/04 | (2006.01) |

(52) U.S. Cl. .................................. 375/240.25
(58) Field of Classification Search ............. 375/340.25, 375/240.25
See application file for complete search history.

(56) References Cited

U.S. PATENT DOCUMENTS

2001/0024470 A1* 9/2001 Radha et al. ............... 375/240.1
2006/0013308 A1* 1/2006 Kim ......................... 375/240.16

FOREIGN PATENT DOCUMENTS

WO WO 2004/043071 A1 5/2004
WO WO 2005/101846 10/2005

OTHER PUBLICATIONS

Supplementary European Search Report for European Patent Application No. 07734085.9, dated Mar. 9, 2011.
Hannuksela M. et al: "Reference picture marking in SVC," ITU Study Group 16—Video Coding Experts Group—ISO/IEC MPEG & ITU-T VCEG (ISO/IEC JTC1/SC29/WG11 and ITU-T SG16 Q6), Jan. 15, 2006.

(Continued)

*Primary Examiner* — Eleni Shiferaw
*Assistant Examiner* — Jing Sims
(74) *Attorney, Agent, or Firm* — Alston & Bird LLP

(57) ABSTRACT

A device, an encoding method, and a decoding method enable a separate marking of base representations and enhanced representations of key access units to save memory or to allow a better scalable video coding optimization. The encoding method of a sequence of original pictures to a sequence of access units includes, after encoding of one of the access units, storing a first decoded picture of the first encoded picture and a second decoded picture of the second encoded picture for inter prediction for encoding of others of the access units; and identifying the first decoded picture and the second decoded picture to be no longer used for inter prediction. The decoding method includes decoding the first access unit, where a first decoded picture is decoded from the first picture and a second decoded picture is decoded from the second picture; marking the first and second decoded pictures as used for inter prediction; decoding the second access unit; and marking one of the first and second decoded pictures as no longer used for inter prediction.

26 Claims, 6 Drawing Sheets

OTHER PUBLICATIONS

Wang, Y-K et al: "Reference picture marking for key pictures," ITU Study Group 16—Video Coding Experts Group—ISO/IEC MPEG & ITU-T VCEG (ISO/IEC JTC1/SC29/WG11 and ITU-T SG16 Q6), Apr. 1, 2006.

Wang, Y-K et al: "SVC DPB management," ITU Study Group 16—Video Coding Experts Group—ISO/IEC MPEG & ITU-T VCEG (ISO/IEC JTC1/SC29/WG11 and ITU-T SG16 Q6), Oct. 11, 2005.

Benierbah and Khamadja, A New technique for quality scalable video coding with H.264. IEEE Transactions on Circuits and Systems for Video Technology, 15(11): 1332-1340, 2005.

Radha et al., The MPEG-4 fine-grained scalable video coding method for multimedia streaming over IP. IEEE Transactions on Multimedia, 3(1): 53-68, 2001.

International Search Report for PCT Application No. PCT/IB2007/000756.

* cited by examiner

REFERENCE PICTURE MARKING IN SCALABLE VIDEO ENCODING AND DECODING

CROSS-REFERENCE TO RELATED PATENT APPLICATIONS

This application claims priority from Provisional Application U.S. Application 60/786,645, filed Mar. 27, 2006, incorporated herein by reference in its entirety.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The present invention relates to scalable video encoding and decoding. In particular, the present invention relates to providing an enhanced reference picture management solution for scalable video coding.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also know as ISO/IEC MPEG-4 AVC). In addition, there are currently efforts underway with regards to the development of new video coding standards. One such standard under development is the scalable video coding (SVC) standard, which will become the scalable extension to H.264/AVC. Another such effort involves the development of China video coding standards. One such video coding standard is: Joint Video Team, "Joint Draft 5: Scalable Video Coding", Jan. 2006, available from http://ftp3.itu.ch/av-arch/jvt-site/2006_01_Bangkok/JVT-R201.zip.

SVC can provide scalable video bitstreams. A portion of a scalable video bitstream can be extracted and decoded with a degraded playback visual quality. A scalable video bitstream contains a non-scalable base layer and one or more enhancement layers. An enhancement layer may enhance the temporal resolution (i.e. the frame rate), the spatial resolution, or simply the quality of the video content represented by the lower layer or part thereof. In some cases, data of an enhancement layer can be truncated after a certain location, even at arbitrary positions, and each truncation position can include some additional data representing increasingly enhanced visual quality. Such scalability is referred to as fine-grained (granularity) scalability (FGS). In contrast to FGS, the scalability provided by a quality enhancement layer that does not provide fined-grained scalability is referred as coarse-grained scalability (CGS). Base layers can be designed to be FGS scalable as well; however, no current video compression standard or draft standard implements this concept.

The mechanism to provide temporal scalability in the current SVC specification—herein referred to as the hierarchical B pictures coding structure—is not more than what is in AVC. This feature is fully supported by AVC and the signalling part can be done using the sub-sequence related supplemental enhancement information (SEI) messages.

For mechanisms to provide spatial and CGS scalabilities, the conventional layered coding technique similar to earlier standards is used with inter-layer prediction methods. Data that could be inter-layer predicted data includes intra texture, motion and residual data. Single-loop decoding is enabled by a constrained intra texture prediction mode, whereby the inter-layer intra texture prediction can be applied to macroblocks (MBs) for which the corresponding block of the base layer is located inside intra MBs, and at the same time those intra MBs in the base layer use constrained intra prediction. In single-loop decoding, the decoder needs to perform motion compensation and full picture reconstruction only for the scalable layer desired for playback (called the desired layer), hence the decoding complexity is greatly reduced. All the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

The spatial scalability has been generalized to enable the base layer to be a cropped and zoomed version of the enhancement layer. The quantization and entropy coding modules were adjusted to provide FGS capability. The coding mode is called as progressive refinement, wherein successive refinements of the transform coefficients are encoded by repeatedly decreasing the quantization step size and applying a "cyclical" entropy coding akin to sub-bitplane coding.

The scalable layer structure in the current draft SVC standard is characterized by three variables, referred to as temporal_level, dependency_id and quality_level, that are signalled in the bit stream or can be derived according to the specification. The temporal_level variable is used to indicate the temporal hierarchy or frame rate.

A layer comprising pictures of a smaller temporal_level value has a smaller frame rate than a layer comprising pictures of a larger temporal_level. dependency_id is used to indicate the inter-layer coding dependency hierarchy. At any temporal location, a picture of a smaller dependency_id value may be used for inter-layer prediction for coding of a picture with a larger dependency_id value. The quality_level variable is used to indicate FGS layer hierarchy. At any temporal location and with identical dependency_id value, an FGS picture with quality_level value equal to QL uses the FGS picture or base quality picture (i.e., the non-FGS picture when QL−1=0) with quality_level value equal to QL−1 for inter-layer prediction. For more information on SVC, see: S. Wenger, Y.-K. Wang, and M. M. Hannuksela, "RTP payload format for H.264/SVC Scalable Video Coding," submitted for Packet Video Workshop, April 2006.

Decoded pictures used for predicting subsequent coded pictures are stored in the decoded picture buffer (DPB). To efficiently utilize the buffer memory, the DPB management processes, including the storage of decoded pictures into the DPB, the marking of reference pictures, output and removal of decoded pictures from the DPB, are specified.

SVC includes the coding of key pictures for which the syntax element nal_ref_idc is equal to 3. Herein an access unit containing key pictures is referred as a key access unit. Key access units typically form the lowest temporal resolution, i.e. they typically belong to the temporal hierarchy with temporal_level equal to 0.

For a key access unit, if the desired scalable layer for playback has quality_level larger than 0, i.e. the target playback picture is a FGS picture, then two representations of the access unit will be stored in the DPB for predicting subsequence pictures. One representation corresponds to the decoded picture with dependency_id equal to the desired value (i.e. DependencyIdmax according to the SVC specification) and quality_level equal to 0. This representation is referred to as the base representation. The other representation corresponds to the decoded picture of the desired layer (with dependency_id equal to DependencyIdmax and quality_level equal to the desired value, or in other words, the value of dOiDX is equal to dOiDXmax according to the SVC specification). This representation is referred to as the enhanced representation.

For non-key access units, only one representation, the decoded picture with dOiDX is equal to dOiDXmax, may be stored in the DPB.

According to the SVC specification, decoding of any key access unit always uses only the representations of earlier decoded key access units for inter prediction and does not use decoded pictures of non-key access units for inter prediction. Decoding of non-key access units only uses the enhanced representations of key access units whenever they are available (if not, use their base representations) and decoded pictures of other non-key access units for inter prediction.

In SVC, the marking of the base representation and the enhanced representation of a key access unit is done at the same time. When the enhanced representation is stored in the DPB, the base representation is also stored in the DPB. When the enhanced representation is marked as "used for short-term reference", the base representation is marked as "used for short-term reference" and as "base representation". When the enhanced representation is marked as "used for long-term reference" and assigned a value of LongTermFrameIdx, the base representation is marked as "used for long-term reference" and as "base representation" and is assigned the same value of LongTermFrameIdx. When the enhanced representation is marked as "unused for reference", the base representation is also marked as "unused for reference".

When fine granular scalability (FGS) is used in SVC and the desired layer for decoding and playback is an FGS layer, then for each so-called key picture two decoded representations of the access unit are stored in the decoded picture buffer for predicting subsequence pictures. One representation, base representation or base key picture, corresponds to the decoded picture with dependency_id equal to the desired value and quality_level equal to 0. The other representation corresponds to the decoded picture of the desired layer. Due to the synchronized reference picture marking process of base representations and enhanced representations of key access units in SVC, some reference pictures stored in the DPB may still be marked as "used for short-term reference" or "used for long-term reference" when it actually becomes not needed any more for inter prediction reference. Consequently, a considerable amount of memory remains occupied unnecessarily.

SUMMARY

According to at least one aspect, there is provided a method for encoding a sequence of original pictures to a sequence of access units, where each access unit includes a first encoded slice of a first encoded picture in a first layer and a second encoded slice of a second encoded picture in a second layer. The second layer is a fine granularity scalable (FGS) layer and the first layer is a non-FGS layer. The method includes, after encoding of one of the access units, storing a first decoded picture of the first encoded picture and a second decoded picture of the second encoded picture for inter prediction for encoding of others of the access units. The method also includes marking the first decoded picture or the second decoded picture as no longer used for inter prediction.

According to another aspect, there is provided a method of decoding an encoded video signal including a first access unit and a second access unit, the first access unit including a first slice of a first picture in a first layer and a second slice of a second picture in a second layer. The second layer is a fine granularity scalable (FGS) layer and the first layer is a non-FGS layer. The method includes decoding the first access unit, where a first decoded picture is decoded from the first picture and a second decoded picture is decoded from the second picture; marking the first and second decoded pictures as used for inter prediction; decoding the second access unit; and marking one of the first and second decoded pictures as no longer used for inter prediction.

According to yet another aspect, there is provided a device for encoding a video signal, where there is a separate marking of base representations and enhanced representations of key access units to save memory or to allow a better scalable video coding optimization. The encoded video signal can include a first access unit and a second access unit, the first access unit including a first slice of a first picture in a first layer and a second slice of a second picture in a second layer. The second layer is a fine granularity scalable (FGS) layer and the first layer is a non-FGS layer.

According to yet still another embodiment, the device for decoding a video signal stores a first decoded picture of the first encoded picture and a second decoded picture of the second encoded picture for inter prediction for encoding of other access units. The device also includes marking the first decoded picture or the second decoded picture as no longer used for inter prediction. The device also decodes the first access unit, where a first decoded picture is decoded from the first picture and a second decoded picture is decoded from the second picture, marks the first and second decoded pictures as used for inter prediction, decodes the second access unit; and marks one of the first and second decoded pictures as no longer used for inter prediction.

These and other features, aspects and advantages of the present invention will become apparent from the following description, appended claims, and the accompanying exemplary embodiments shown in the drawings, which are briefly described below.

DETAILED DESCRIPTION OF PREFERRED EMBODIMENTS

Exemplary embodiments will be described below with reference to the accompanying drawings. It should be understood that the following description is intended to describe exemplary embodiments of the invention, and not to limit the invention.

Figure 1:
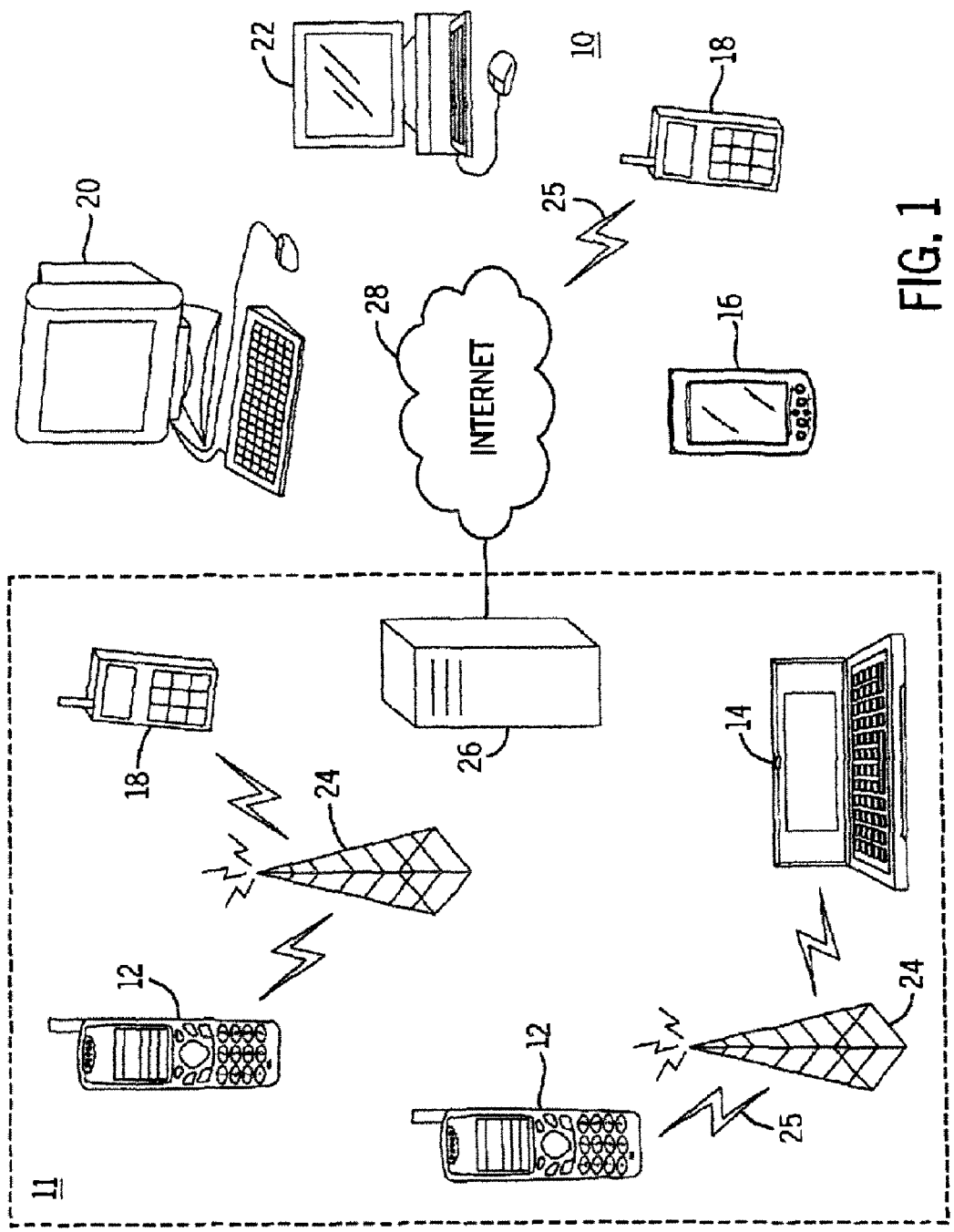
FIG. 1 is an overview diagram of a system within which exemplary embodiments may be implemented.

FIG. 1 shows a system 10 in which exemplary embodiments can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
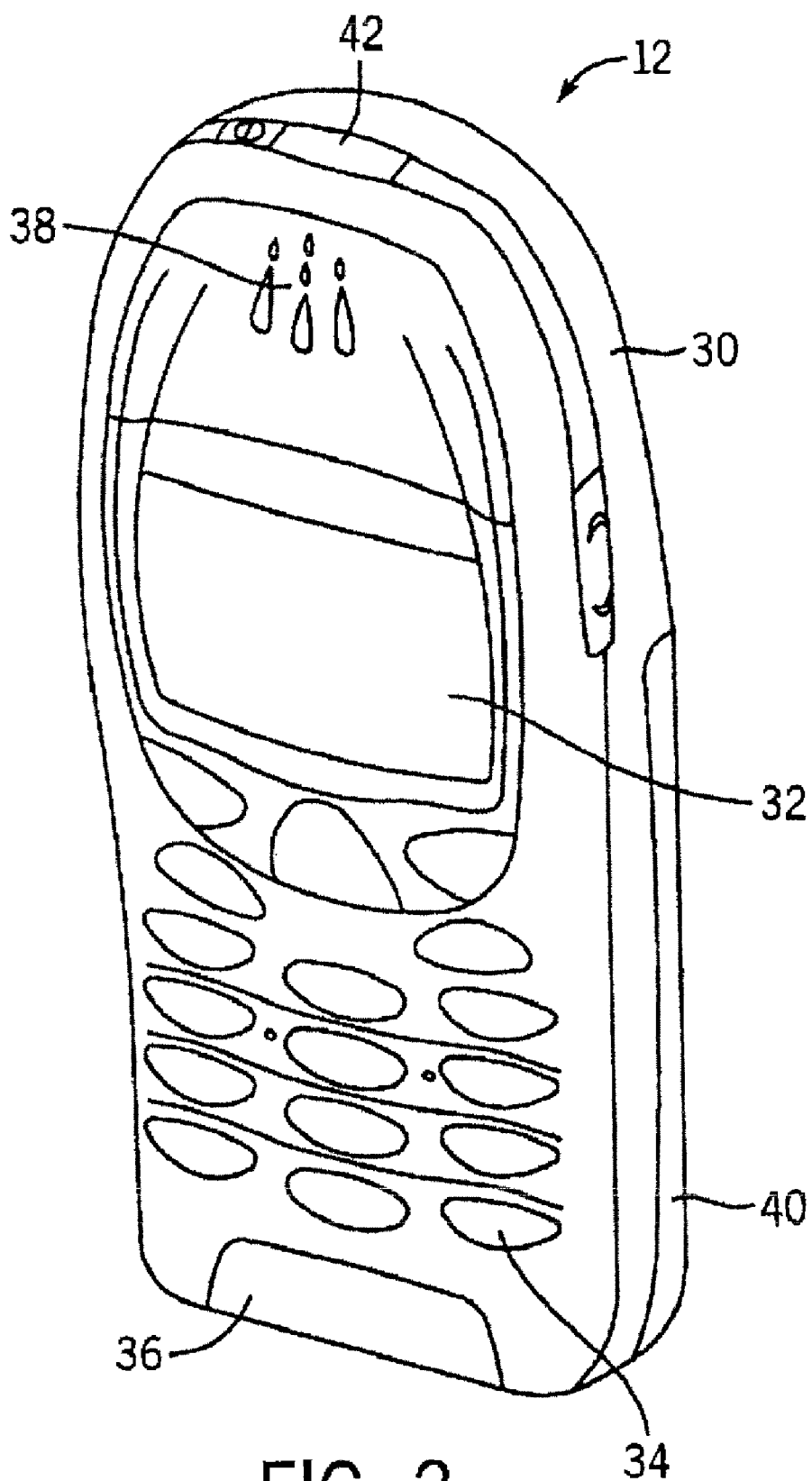
FIG. 2 is a perspective view of a mobile telephone that can be used in an implementation of exemplary embodiments.
Figure 3:
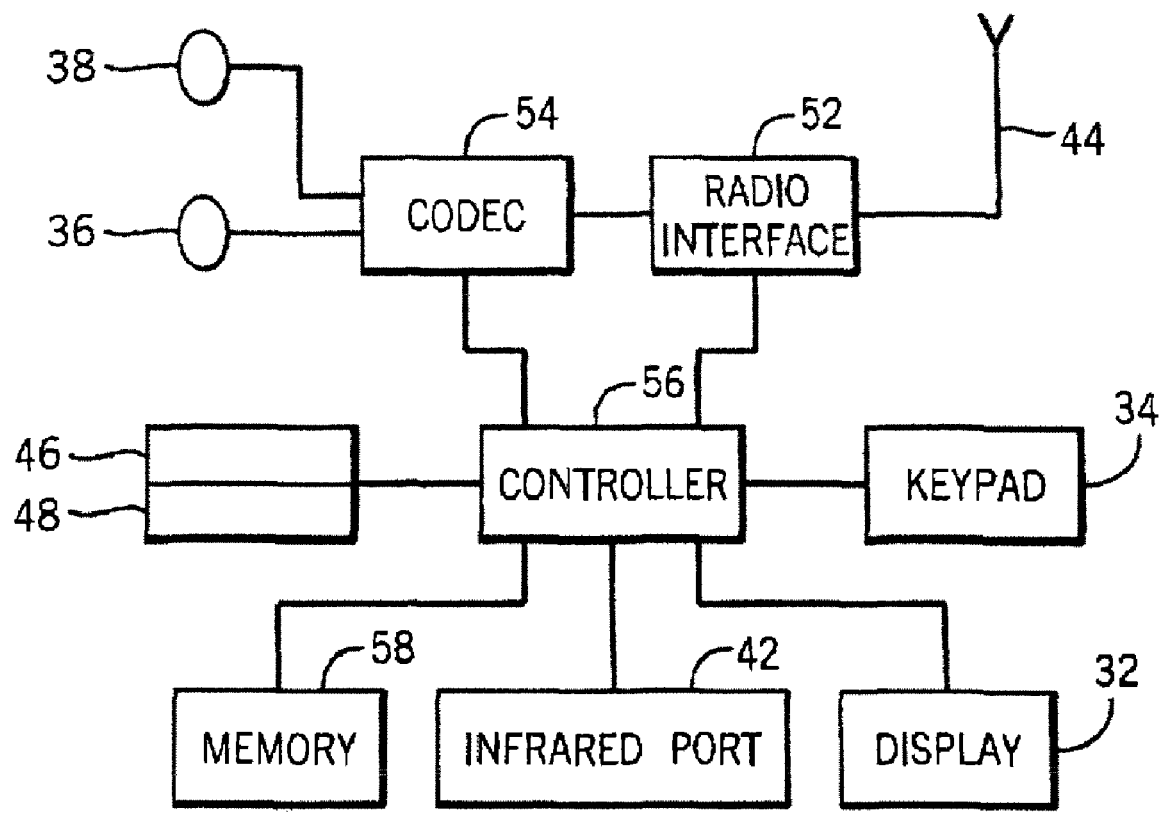
FIG. 3 is a schematic representation of the telephone circuitry of the mobile telephone of FIG. 2.

FIGS. 2 and 3 show a representative mobile telephone 12 within which the exemplary embodiments may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC, a card reader 48, radio interface circuitry 52, codec circuitry 54, a controller 56 and a memory 58. Individual circuits and elements are all of a type well known in the art, for example in the Nokia range of mobile telephones.

Figure 4:
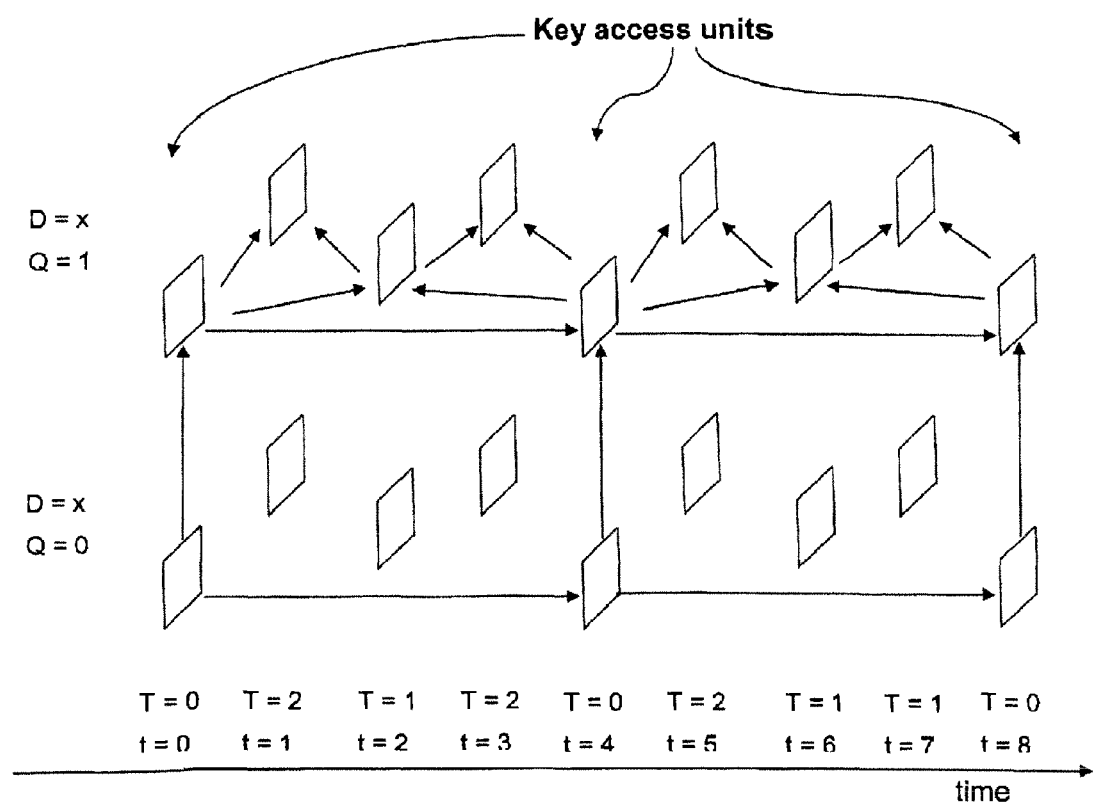
FIG. 4 is a diagram depicting a temporal segment of an exemplary scalable video stream with only the pictures with depedency_id equal to DependencyIdmax.

FIG. 4 depicts a temporal segment of an exemplary scalable video stream where only the pictures with depednecy_id equal to DependencyIdmax are shown. T represents the temporal_level, D represents dependency_id, Q represents quality_level, and t represents time. In FIG. 4, the time values are relative, i.e., time=0 does not necessarily mean the time of the first picture in display order in the bitstream. In the most typical case, the shown pictures in key access units are coded as P or EP slices and use only one reference picture, while pictures in non-key access units are coded as B or EB slices and use only two reference pictures. The prediction relationship is shown by the arrows. The point-to object uses the point-from object for inter prediction reference.

As can be seen in FIG. 4, after decoding of the $2^{nd}$ key access unit, the base representation of the $1^{st}$ access unit is not needed any more for inter prediction reference, while the enhanced representation of the same access unit is still needed for the decoding the non-key access units. However, according to the SVC specification, both the base representation and the enhanced representation have to be stored in the DPB when decoding of the non-key picture with t=2. In other words, the memory of one frame store is unnecessarily occupied or wasted.

In other cases, more memory may be unnecessarily wasted. For example, for better coding efficiency or higher error resilience, it may be desirable to use a larger number of reference pictures for coding base representations than coding enhanced representations of key pictures. In this case, according to a conventional reference picture marking process, a certain number of enhanced representations of key pictures have to be unnecessarily bounded together with their base presentations and kept in DBP even though they are no longer needed for reference. This is just one example. There are also many other similar examples where memory may be potentially saved. The exemplary embodiments address these issues by utilizing single-loop decoding and the fresh harmonized marking process of base representations and enhanced representations of key access units in SVC.

According to at least one exemplary embodiment, a separate marking of base representations and enhanced representations of key access units is provided to save memory or to allow a better scalable video coding optimization. Specifically, the exemplary embodiment includes at least two aspects. A first aspect includes a modified sliding window reference picture marking process, where a base representation and the corresponding enhanced representation have different priorities for being marked as "unused for reference." A second aspect includes a modified adaptive reference picture marking process, where the marking of base representations as "unused for reference" is independent of the marking of enhanced representations as "unused for reference."

The exemplary embodiments may be implemented based on the SVC standard and progressive coding. However, the exemplary embodiments may also be applicable to other scalable coding methods. According to the current SVC specification, slices with quality_level larger than 0 are progressive refinement slices, for which the slice headers do not include reference picture marking syntax elements in dec_ref_pic_marking( ). The slice header syntax of the progressive slices in key access units, (i.e., PR slices with nal_ref_idc equal to 3) is changed to enable separated reference picture marking processes for a key access unit's base representation and enhanced representation, and also to keep the backward compatibility with AVC when the base representation is decoded from an AVC-compatible coded picture. Table 1 shows the changed syntax of slice_header_in_sclable_extension( ).

TABLE 1

| Slice_header_in_scalable_extension( ) { | C | Descriptor |
|---|---|---|
| First_mb_in_slice | 2 | ue(v) |
| slice_type | 2 | ue(v) |
| if( slice_type == PR ) { | | |
|   fragmented_flag | 2 | u(1) |
|   if( fragmented_flag == 1 ) { | | |
|     fragment_order | 2 | ue(v) |
|     if ( fragment_order != 0) | | |

TABLE 1-continued

| Slice_header_in_scalable_extension( ) { | C | Descriptor |
|---|---|---|
|     last_fragment_flag | 2 | u(1) |
|   } | | |
|   if( fragment_order == 0 ) { | | |
|     num_mbs_in_slice_minus1 | 2 | ue(v) |
|     luma_chroma_sep_flag | 2 | u(1) |
|   } | | |
| } | | |
| if( slice_type != PR || fragment_order == 0 ) { | | |
|   pic_parameter_set_id | 2 | ue(v) |
|   frame_num | 2 | u(v) |
|   if( !frame_mbs_only_flag ) { | | |
|     field_pic_flag | 2 | u(1) |
|     if( field_pic_flag ) | | |
|       bottom_field_flag | 2 | u(1) |
|   } | | |
|   if( nal_unit_type == 21 ) | | |
|     idr_pic_id | 2 | ue(v) |
|   if( pic_order_cnt_type == 0 ) { | | |
|     pic_order_cnt_lsb | 2 | u(v) |
|     if( pic_order_present_flag && !field_pic_flag ) | | |
|       delta_pic_order_cnt_bottom | 2 | se(v) |
|   } | | |
|   if( pic_order_cnt_type == 1 && !delta_pic_order_always_zero_flag ) { | | |
|     delta_pic_order_cnt[ 0 ] | 2 | se(v) |
|     if( pic_order_present_flag && !field_pic_flag ) | | |
|       delta_pic_order_cnt[ 1 ] | 2 | se(v) |
|   } | | |
| } | | |
| if( slice_type != PR ) { | | |
|   if( redundant_pic_cnt_present_flag ) | | |
|     redundant_pic_cnt | 2 | ue(v) |
|   if( slice_type == EB ) | | |
|     direct_spatial_mv_pred_flag | 2 | u(1) |
|   base_id_plus1 | 2 | ue(v) |
|   if( base_id_plus1 != 0 ) { | | |
|     adaptive_prediction_flag | 2 | u(1) |
|   } | | |
|   if( slice_type == EP || slice_type == EB ) { | | |
|     num_ref_idx_active_override_flag | 2 | u(1) |
|     if( num_ref_idx_active_override_flag ) { | | |
|       num_ref_idx_l0_active_minus1 | 2 | ue(v) |
|       if( slice_type == EB ) | | |
|         num_ref_idx_l1_active_minus1 | 2 | ue(v) |
|     } | | |
|   } | | |
|   ref_pic_list_reordering( ) | 2 | |
|   if( ( weighted_pred_flag && slice_type == EP ) || | | |
|     ( weighted_bipred_idc == 1 && slice_type == EB ) ) { | | |
|     if( adaptive_prediction_flag) | | |
|       base_pred_weight_table_flag | 2 | u(1) |
|     if( base_pred_weight_table_flag == 0 ) | | |
|       pred_weight_table( ) | | |
|   } | | |
| } | | |
| if( slice_type != PR ) { | | |
|   if( nal_ref_idc != 0 ) | | |
|     dec_ref_pic_marking( ) | 2 | |
| } else { | | |
|   if (nal_ref_idc == 3 && fragment_order == 0 ) | | |
|     dec_ref_pic_marking_in_pr_slice( ) | | |
| } | | |
| if( slice_type != PR ) { | | |
|   if( entropy_coding_mode_flag && slice_type != EI ) | | |
|     cabac_init_idc | 2 | ue(v) |
| } | | |
| if( slice_type != PR || fragment_order == 0 ) { | | |
|   slice_qp_delta | 2 | se(v) |
|   if( deblocking_filter_control_present_flag ) { | | |
|     disable_deblocking_filter_idc | 2 | ue(v) |
|     if( disable_deblocking_filter_idc != 1 ) { | | |
|       slice_alpha_c0_offset_div2 | 2 | se(v) |
|       slice_beta_offset_div2 | 2 | se(v) |
|     } | | |
|   } | | |
| } | | |
| if( slice_type != PR ) | | |
|   if( num_slice_groups_minus1 > 0 && | | |
|     slice_group_map_type >= 3 && slice_group_map_type <= 5) | | |

TABLE 1-continued

| Slice_header_in_scalable_extension( ) { | C | Descriptor |
|---|---|---|
|     slice_group_change_cycle | 2 | u(v) |
|   if( slice_type != PR && extended_spatial_scalability > 0 ) { | | |
|     if( chroma_format_idc > 0 ) { | | |
|       base_chroma_phase_x_plus1 | 2 | u(2) |
|       base_chroma_phase_y_plus1 | 2 | u(2) |
|     } | | |
|     if( extended_spatial_scalability == 2 ) { | | |
|       scaled_base_left_offset | 2 | se(v) |
|       scaled_base_top_offset | 2 | se(v) |
|       scaled_base_right_offset | 2 | se(v) |
|       scaled_base_bottom_offset | 2 | se(v) |
|     } | | |
|   } | | |
|   if( slice_type == PR ) { | | |
|     adaptive_ref_fgs_flag | 2 | u(1) |
|     if( adaptive_ref_fgs_flag ) { | | |
|       max_diff_ref_scale_for_zero_base_block | 2 | u(5) |
|       max_diff_ref_scale_for_zero_base_coeff | 2 | u(5) |
|     } | | |
|   } | | |
|   SpatialScalabilityType = spatial_scalability_type( ) | | |
| } | | |

The syntax of dec_ref_pic_marking_in pr_slice( ) added to the syntax of slice_header_in_sclable_extension( ) is shown in Table 2.

TABLE 2

| dec_ref_pic_marking_in_pr_slice( ) { | C | Descriptor |
|---|---|---|
|   if( nal_unit_type != 21) { | | |
|     adaptive_ref_pic_marking_mode_flag | 2 | u(1) |
|     if( adaptive_ref_pic_marking_mode_flag ) | | |
|       do { | | |
|         memory_management_control_operation | 2 | ue(v) |
|         if( memory_management_control_operation == 1 ) | | |
|           difference_of_pic_nums_minus1 | 2 | ue(v) |
|         if(memory_management_control_operation == 2 ) | | |
|           long_term_pic_num | 2 | ue(v) |
|       } while( memory_management_control_operation != 0 ) | | |
|   } | | |
| } | | |

By way of example, the syntax reference picture marking in PR slices (dec_ref_pic_marking_in_pr_slice( )) is present in the slice headers (slice_header_in_sclable_extension( )) of the NAL units with quality_level greater than 0 and nal_ref_idc equal to 3. The syntax elements adaptive_ref_pic_marking_mode_flag, memory_management_control_operation, difference_of_pic_nums_minus1 and long_term_pic_num specify the marking of reference pictures as "unused for reference." The adaptive_ref_pic_marking_mode_flag has the same semantics as the syntax element adaptive_ref_pic_marking_mode_flag in dec_ref_pic_marking( ) as specified in the SVC specification.

The memory_management_control_operation specifies a control operation to be applied to affect the reference picture marking. The memory_management_control_operation syntax element is followed by data necessary for the operation specified by the value of memory_management_control_operation. The parameter values and control operations associated with memory_management_control_operation are shown in Table 3. The memory_management_control_operation syntax elements are processed by the decoding process in the order in which they appear in the slice header, and the semantics constraints expressed for each memory_management_control_operation apply at the specific position in that order at which that individual memory_management_control_operation is processed.

The memory_management_control_operation is not set equal to 1 in a slice header unless the specified reference picture is marked as "used for short-term reference" and as "base representation" when the memory_management_control_operation is processed by the decoding process. The memory_management_control_operation is not set equal to 2 in a slice header unless the specified long-term picture number refers to a reference picture that is marked as "used for long-term reference" and as "base representation" when the memory_management_control_operation is processed by the decoding process.

TABLE 3

| memory_management_control_operation parameter value | Memory Management Control Operation |
|---|---|
| 0 | End memory_management_control_operation syntax element loop |
| 1 | Mark a short-term base representation as "unused for reference" |
| 2 | Mark a long-term base representation as "unused for reference" |

The difference_of_pic_nums_minus1 is used (with memory_management_control_operation equal to 1) to mark a short-term reference picture as "unused for reference". When the associated memory_management_control_operation is processed by the decoding process, the resulting picture number derived from difference_of_pic_nums_minus1 is a picture number assigned to one of the reference pictures marked as "used for reference" and as "base representation".

The resulting picture number is constrained as follows. If field_pic_flag is equal to 0, the resulting picture number is one of the set of picture numbers assigned to reference frames or complementary reference field pairs. Otherwise (i.e., field_pic_flag is equal to 1), the resulting picture number is one of the set of picture numbers assigned to reference fields.

The long_term_pic_num is used (with memory_management_control_operation equal to 2) to mark a long-term reference picture as "unused for reference." When the associated memory_management_control_operation is processed by the decoding process, long_term_pic_num is equal to a long-term picture number assigned to one of the reference pictures that is currently marked as "used for long-term reference" and as "base representation."

The resulting long-term picture number is constrained as follows. If field_pic_flag is equal to 0, the resulting long-term picture number is one of the set of long-term picture numbers assigned to reference frames or complementary reference field pairs. Otherwise (i.e., field_pic_flag is equal to 1), the resulting long-term picture number is one of the set of long-term picture numbers assigned to reference fields.

According to the exemplary embodiments, the decoded reference picture marking process is invoked when all slices of an access unit are decoded and when the decoded result is used for inter prediction reference of following access units in decoding order. If the access unit is not a key access unit, the marking process is the same as specified in the SVC specification. If the decoded picture for output has quality_level equal to 0, i.e., dOiDXmax is equal to DependencyIdmax<<2, the marking process is also the same as specified in the SVC specification. If the decoded picture for output has quality_level greater than 0, i.e., dOiDXmax is greater than DependencyIdmax<<2, the marking process described with reference to FIGS. 5 and 6 is used.

Figure 5:
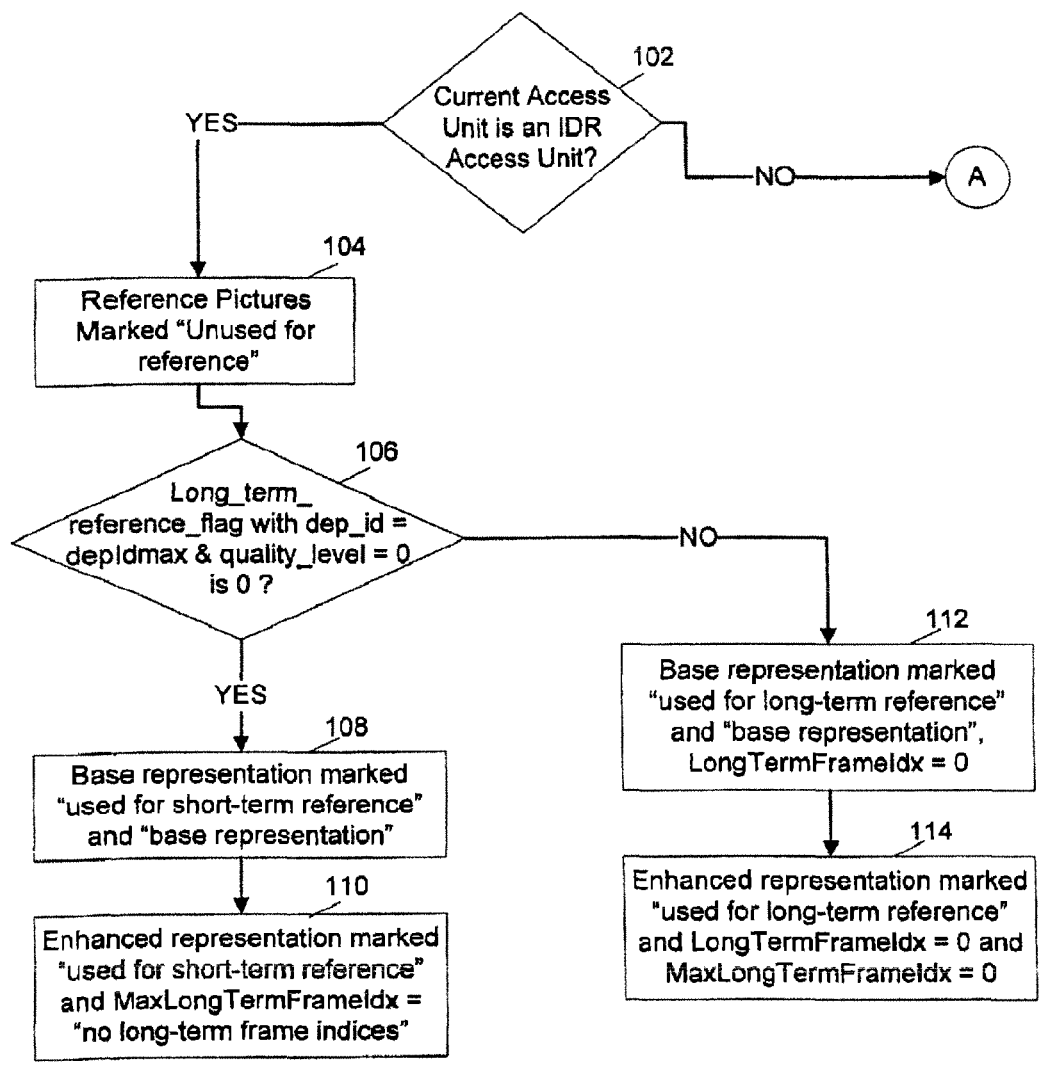
FIGS. 5 and 6 are flow diagrams depicting operations performed in a decoded reference picture marking process.
Figure 6:
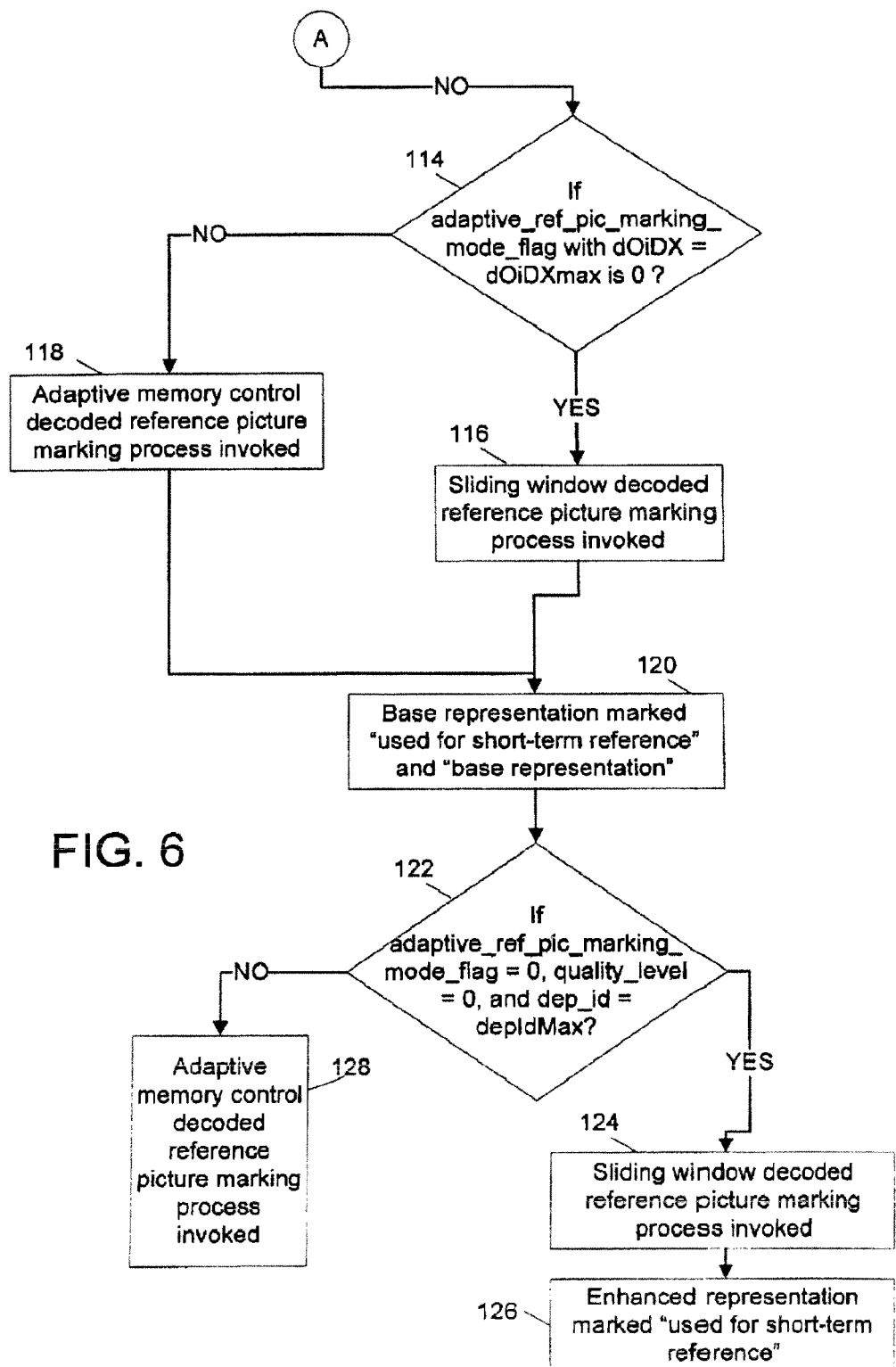

FIGS. 5 and 6 illustrates operations performed in the decoded reference picture marking process. Additional, fewer, or different operations may be performed depending on the embodiment. The operations may also be performed in a different order than that shown here. It does not matter whether the base representation or the enhanced representation is first handled. In the operations described with reference to FIGS. 5 and 6, it is assumed that the base representation is first handled.

In an operation 102 shown in FIG. 5, a determination is made whether the current access unit is an IDR access unit. If the current access unit is an IDR access unit, all reference pictures are marked as "unused for reference" in an operation 104. In an operation 106, a determination is made whether long_term_reference_flag in the slice headers of the NAL that have dependency_id equal to DependencyIdmax and quality_level equal to 0 is equal to 0. If so, an operation 108 is performed in which the base representation is marked as "used for short-term reference" and as "base representation." In an operation 110, the enhanced representation is marked as "used for short-term reference" and MaxLongTermFrameIdx is set equal to "no long-term frame indices."

If the determination in operation 106 is no (i.e., long_term_reference_flag in the slice headers of the NAL units that have dependency_id equal to DependencyIdmax and quality_level equal to 0 is equal to 1), an operation 112 is performed in which the base representation is marked as "used for long-term reference" and as "base representation", and the LongTermFrameIdx for the base representation is set equal to 0. An operation 114 is also performed in which the enhanced representation is marked as "used for long-term reference", the LongTermFrameIdx for the enhanced representation is set equal to 0, and MaxLongTermFrameIdx is set equal to 0.

If the determination in operation 102 is no (i.e., the current access unit is not an IDR access unit), an operation 114 (FIG. 6) is performed in which a determination is made whether adaptive_ref_pic_marking_mode_flag in the slice headers of the NAL units that have dOiDX equal to dOiDXmax is equal to 0. If so, an operation 116 is performed in which the sliding window decoded reference picture marking process as specified in subclause 8.2.5.3 in SVC is invoked. During the invocation process, if there exist both a base representation (marked as "base representation") and an enhanced representation (not marked as "base representation") having the smallest value of FrameNumWrap, then the base representation is marked as "unused for reference."

If the determination made in operation 114 is no (i.e., adaptive_ref_pic_marking_mode_flag in the slice headers of the NAL units that have dOiDX equal to dOiDXmax is equal to 1), an operation 118 is performed in which the adaptive memory control decoded reference picture marking process as specified in subclause 8.2.5.4 of the SVC specification is invoked. The reference pictures that are not marked as "base representation" are not considered in the invocation of the process. That is, only the reference pictures that are marked as "base representation" are considered in the invocation of the process.

After operation 116 or 118, the base representation is marked as "used for short-term reference" and as "base representation" in an operation 120. In an operation 122, a determination is made whether adaptive_ref_pic_marking_mode_flag in the slice headers of the NAL units is that have dependency_id equal to DependencyIdmax and quality_level equal to 0 is equal to 0. If so, an operation 124 is performed in which the sliding window decoded reference picture marking process as specified in subclause 8.2.5.3 in SVC is invoked. During the invocation process if there exist both a base representation (marked as "base representation") and an enhanced representation (not marked as "base representation") having for the smallest value of FrameNumWrap, then the base representation is marked as "unused for reference." An operation 126 is also performed in which the enhanced representation is marked as "used for short-term reference."

If the determination in operation 122 is no (i.e., adaptive_ref_pic_marking_mode_flag in the slice headers of the NAL units that have dependency_id equal to DependencyIdmax and quality_level equal to 0 is equal to 1), an operation 128 is performed in which the adaptive memory control decoded reference picture marking process as specified in subclause 8.2.5.4 of the SVC specification is invoked. The reference pictures that are marked as "base representation" are not considered in the invocation of the process. If during the invocation of the process a LongTermFrameIdx is assigned to a picture and there exists a base representation with an identical value of PicNum (before assigning the long-term frame index), the LongTermFrameIdx is also assigned to this base representation, and the marking of "used for short-term reference" is changed from to "used for long-term reference." Further, when the enhanced representation of the current access unit was not marked as "used for long-term reference" in the invocation of the adaptive memory control decoded reference picture marking process by memory_management_control_operation is equal to 6 according to the SVC specification, it is marked as "used for short-term reference."

In another exemplary embodiment, no syntax element is added to the slice headers of progressive slices of key access units. Rather, the decoded reference picture marking syntax in dec_ref_pic_marking( ) is changed to be as shown in Table 4.

In this embodiment, the decoded reference picture marking process is the same as in the SVC specification with at least the following two differences. One difference is the invocation of the sliding window decoded reference picture marking process as specified in subclause 8.2.5.3 in SVC. During the invocation process, if there exist both a base representation (marked as "base representation") and an enhanced representation (not marked as "base representation") having for the smallest value of FrameNumWrap, then the base representation is marked as "unused for reference."

A second difference is the invocation of the adaptive decoded reference picture marking process as specified in subclause 8.2.5.4 in SVC. During the invocation process, if there exists a memory_management_control_operation equal to 1, and the corresponding base_represenation_flag is equal to 1, the reference picture that has the identified PicNum, marked as "used for short-term reference" and marked as "base representation" is marked as "unused for reference." If there exists a memory_management_control_operation equal to 1, and the corresponding base_represenation_flag is equal to 0, the reference that has the identified PicNum, marked as "used for short-term reference" and not marked as "base representation" is marked as "unused for reference". If there exists a memory_management_control_operation equal to 2, and the corresponding base_represenation_flag is equal to 1, the reference picture that has the identified LongTermPicNum, marked as "used for long-term reference" and marked as "base representation" is marked as "unused for reference". If there exists a memory_management_control_operation equal to 2, and the corresponding base_represenation_flag is equal to 0, the reference picture that has the identified LongTermPicNum, marked as "used for long-term reference" and not marked as "base representation" is marked as "unused for reference".

The above embodiment does not work for AVC-compatible base layer. In such a case, a signal similar as in Table 2 can be signaled in a NAL unit that contains common parameters for all the slices and slice data partitions of a AVC-compatible coded picture. When DepedencyIdmax is equal to 0, it is applied a decoded reference picture marking process similar as the embodiments when Table 2 syntax is signaled in the progressive slice headers of key access units.

It should be noted that the bitstream to be decoded can be received from a remote device located within virtually any type of network. Additionally, the bitstream can be received from local hardware or software. Further, it should be understood that, although text and examples contained herein may specifically describe an decoding process, one skilled in the art would readily understand that the same concepts and principles also apply to the corresponding encoding process and vice versa.

The exemplary embodiments are described in the general context of method operations, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

TABLE 4

| dec_ref_pic_marking( ) { | C | Descriptor |
|---|---|---|
| if( nal_unit_type == 5 \|\| nal_unit_type == 21) { | | |
| /* nal_unit_type 21 is specified in Annex F */ | | |
|   no_output_of_prior_pics_flag | 2\|5 | u(1) |
|   long_term_reference_flag | 2\|5 | u(1) |
| } else { | | |
|   adaptive_ref_pic_marking_mode_flag | 2\|5 | u(1) |
|   if( adaptive_ref_pic_marking_mode_flag ) | | |
|     do { | | |
|       memory_management_control_operation | 2\|5 | ue(v) |
|       if( (memory_management_control_operation == 1 \|\| | | |
|         memory_management_control_operation == 2 ) | | |
|         && nal_ref_idc == 3 ) | | |
|         base_represenation_flag | 2\|5 | u(1) |
|       if( memory_management_control_operation == 1 \|\| | | |
|         memory_management_control_operation == 3 ) | | |
|         difference_of_pic_nums_minus1 | 2\|5 | ue(v) |
|       if(memory_management_control_operation == 2 ) | | |
|         long_term_pic_num | 2\|5 | ue(v) |
|       if( memory_management_control_operation == 3 \|\| | | |
|         memory_management_control_operation == 6 ) | | |
|         long_term_frame_idx | 2\|5 | ue(v) |
|       if( memory_management_control_operation == 4 ) | | |
|         max_long_term_frame_idx_plus1 | 2\|5 | ue(v) |
|     } while( memory_management_control_operation != 0 ) | | |
|   } | | |
| } | | |

The foregoing description of exemplary embodiments have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of decoding an encoded video signal, the method comprising:
   decoding, by a processor, a key access unit, the key access unit including at least one slice in a base layer and at least one slice in a scalable layer, wherein a base representation picture is decoded from at least one slice in the base layer and an enhanced representation picture is decoded from at least one slice in the scalable layer;
   marking, by the processor, the base representation and enhanced representation pictures as used for inter prediction;
   decoding, by the processor, a non-key access unit; and
   marking, by the processor, one of the base representation and enhanced representation pictures as no longer used for inter prediction.

2. The method of claim 1, wherein:
   the scalable layer corresponds to a fine granularity scalability representation.

3. The method of claim 1, further comprising:
   retrieving a reference picture management information for the key access unit during decoding of the non-key access unit.

4. The method of claim 3, wherein:
   the reference picture management information comprises information for the base representation picture of the key access unit.

5. The method of claim 3, wherein:
   the reference picture management information comprises information for the enhanced representation picture of the key access unit.

6. The method of claim 1, further comprising:
   defining different priority levels to the base representation picture and the enhanced representation picture; and
   marking at least one of the base representation picture and the enhanced representation picture as unused for reference based on the priority levels.

7. A method of encoding a video signal, the method comprising:
   encoding, by a processor, a key access unit, the key access unit including at least one slice in a base layer and at least one slice in a scalable layer;
   decoding, by the processor, a base representation picture from at least one slice in the base layer and an enhanced representation picture from at least one slice in the scalable layer;
   storing, by the processor, the base representation picture and the enhanced representation picture for inter prediction in encoding of other access units; and
   encoding, by the processor, a non-key access unit, marking one of the base representation and enhanced representation pictures as no longer used for inter prediction.

8. The method of claim 7, wherein:
   the scalable layer corresponds to a fine granularity scalability representation.

9. The method of claim 7, further comprising:
   providing a reference picture management information for the key access unit during encoding of the non-key access unit.

10. The method of claim 9, wherein:
    the reference picture management information comprises information for the base representation picture of the key access unit.

11. The method of claim 9, wherein:
    the reference picture management information comprises information for the enhanced representation picture of the key access unit.

12. The method of claim 7, further comprising:
    defining different priority levels to the base representation picture and the enhanced representation picture; and
    marking at least one of the base representation picture and the enhanced representation picture as "unused for reference" based on the priority levels.

13. A device for decoding an encoded video signal, the device comprising:
    a processor;
    a memory effectively coupled to the processor; and
    programmed instructions to:
      decode a key access unit, the key access unit including at least one slice in a base layer and at least one slice in a scalable layer, wherein a base representation picture is decoded from at least one slice in the base layer and an enhanced representation picture is decoded from at least one slice in the scalable layer;
      mark the base representation and enhanced representation pictures stored in the memory as used for inter prediction;
      decode a non-key access unit; and
      mark one of the base representation and enhanced representation pictures as no longer used for inter prediction.

14. The device of claim 13, wherein:
    the scalable layer corresponds to a fine granularity scalability representation.

15. The device of claim 13, wherein the programmed instructions are further configured to:
    retrieve a reference picture management information for the key access unit during decoding of the non-key access unit.

16. The device of claim 15, wherein:
    the reference picture management information comprises information for the base representation picture of the key access unit.

17. The device of claim 15, wherein:
    the reference picture management information comprises information for the enhanced representation picture of the key access unit.

18. The device of claim 13, wherein the programmed instructions are further configured to:
    define different priority levels to the base representation picture and the enhanced representation picture; and
    mark at least one of the base representation picture and the enhanced representation picture as unused for reference based on the priority levels.

19. A device for encoding a video signal, the device comprising:
    a processor;
    a memory effectively coupled to the processor; and
    programmed instructions to:
      encode a key access unit, the key access unit including at least one slice in a base layer and at least one slice in a scalable layer;
      decode a base representation picture from at least one slice in the base layer and an enhanced representation picture from at least one slice in the scalable layer;

store the base representation picture and the enhanced representation picture in the memory for inter prediction in encoding of other access units;

encode a non-key access unit; and mark one of the base representation and enhanced representation pictures as no longer used for inter prediction.

20. The device of claim 19, wherein:

the base representation picture and the enhanced representation picture are marked used for short-term reference.

21. The device of claim 19, wherein:

the scalable layer corresponds to a fine granularity scalability representation.

22. The device of claim 19, wherein the programmed instructions are further configured to:

define different priority levels to the base representation picture and the enhanced representation picture; and mark at least one of the base representation picture and the enhanced representation picture as unused for reference based on the priority levels.

23. The device of claim 19, wherein the programmed instructions are further configured to:

provide a reference picture management information for the key access unit during encoding of the non-key access unit.

24. The device of claim 23, wherein:

the reference picture management information comprises information for the base representation picture of the key access unit.

25. The device of claim 23, wherein:

the reference picture management information comprises information for the enhanced representation picture of the key access unit.

26. The device of claim 19, wherein:

the base representation picture and the enhanced representation picture are independently identified, the programmed instructions further configured to:

mark the base representation picture and the enhanced representation picture as unused for reference.

* * * * *